United States Patent [19]

Ando et al.

[11] 4,141,774

[45] Feb. 27, 1979

[54] HOT-MELT ADHESIVE COMPOSITION AND PROCESS EMPLOYING SAME

[75] Inventors: Ken Ando, Ikoma; Minoru Kamosaki, Ohimachi; Yoshinobu Ohya, Amagasaki; Sigeru Asai, Ohimachi, all of Japan

[73] Assignee: Daicel Ltd., Osaka, Japan

[21] Appl. No.: 807,183

[22] Filed: Jun. 16, 1977

Related U.S. Application Data

[63] Continuation of Ser. No. 616,111.

[30] Foreign Application Priority Data

Sep. 24, 1974 [JP]  Japan ................................ 49-109785

[51] Int. Cl.$^2$ ......................... C09J 5/00; C08G 12/04
[52] U.S. Cl. ..................................... 156/309; 156/331; 428/246; 428/458; 428/287; 428/474; 528/231; 528/326; 528/311; 528/333
[58] Field of Search ........................ 156/218, 331, 309; 428/246, 458, 287, 474; 260/21, 78 A, 72 R, 78 L, 72 N, 78 SC

[56] References Cited

U.S. PATENT DOCUMENTS

| | | | |
|---|---|---|---|
| 2,430,860 | 11/1947 | Cairns | 260/72 N |
| 2,430,866 | 11/1947 | Foster et al. | 260/78 SC |
| 2,542,288 | 2/1951 | Pickens | 156/331 |
| 2,597,855 | 5/1952 | Czarnecki | 428/458 |
| 3,515,702 | 6/1970 | Raabe | 260/78 L |
| 3,679,638 | 7/1972 | Korsgen et al. | 260/78 A |

FOREIGN PATENT DOCUMENTS 1115035  5/1968  United Kingdom ..................... 156/331

*Primary Examiner*—Wiliam A. Powell
*Assistant Examiner*—J. J. Gallagher
*Attorney, Agent, or Firm*—Blanchard, Flynn, Thiel, Boutell & Tanis

[57] ABSTRACT

A hot-melt adhesive composition containing a methoxymethylated terpolymer prepared from the corresponding terpolymer that is soluble in lower alcohols and contains a higher nylon salt or an $\omega$-amino acid, or a lactam, each of which has more than 10 carbon atoms, and wherein the methoxymethylation ratio of the nylon copolymer is in the range of 10 to 30%.

5 Claims, 3 Drawing Figures

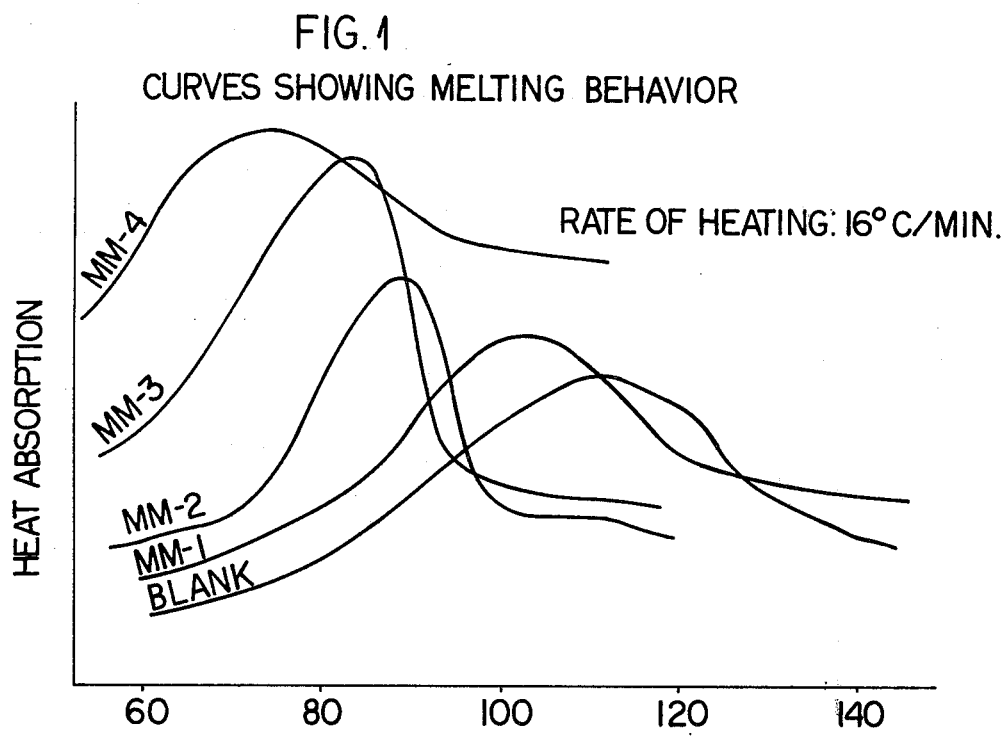
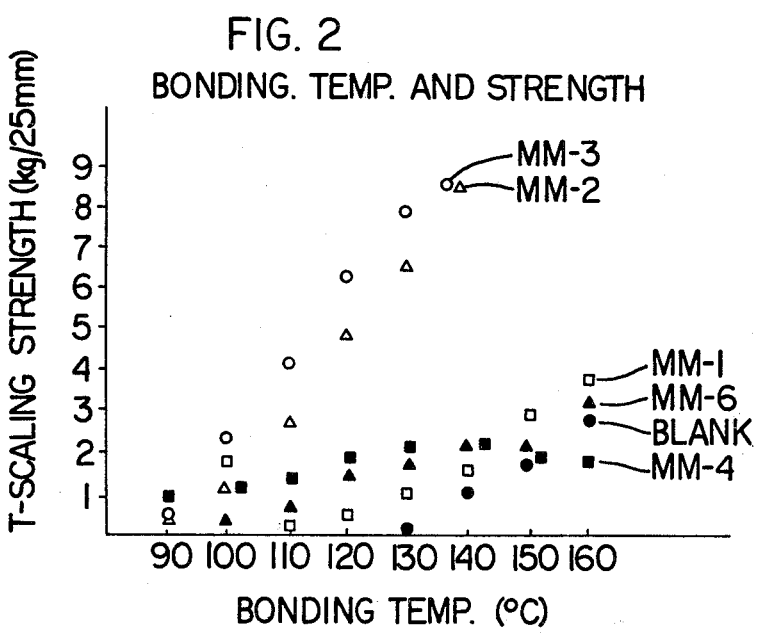

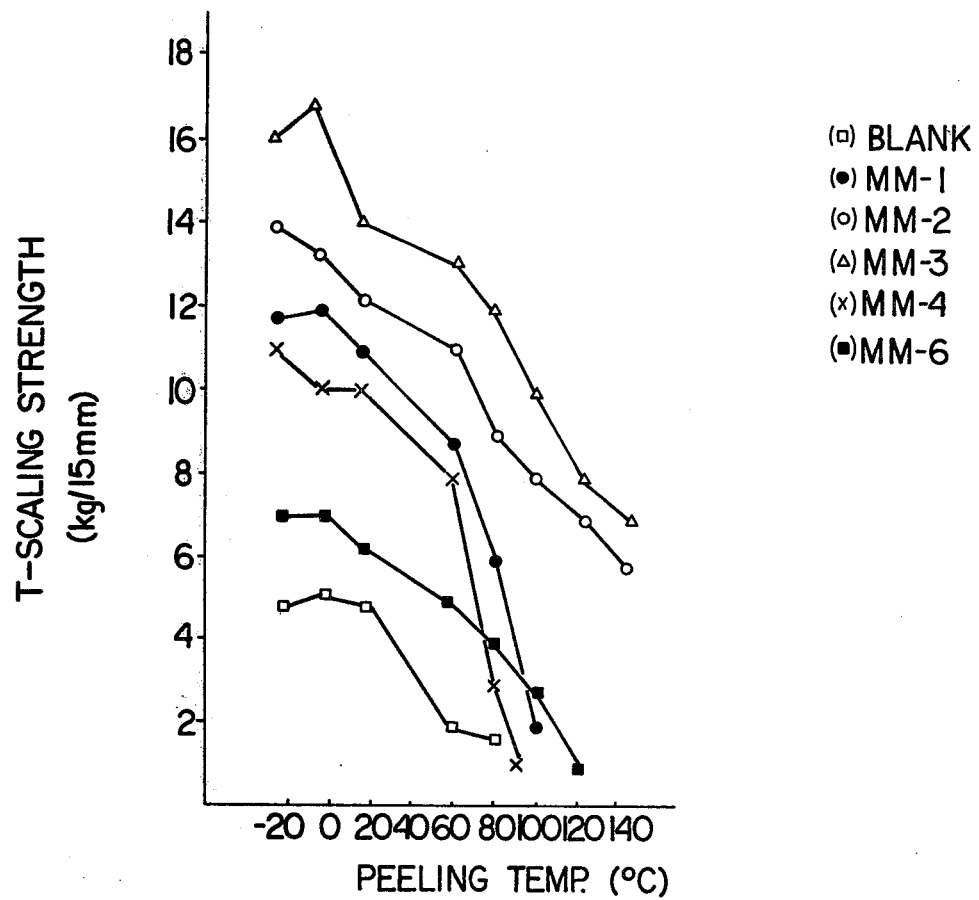

HOT-MELT ADHESIVE COMPOSITION AND PROCESS EMPLOYING SAME

This is a continuation of application Ser. No. 616,111 filed Sept. 23, 1975, now abandoned.

BACKGROUND OF THE INVENTION

1. Field of the Invention

This invention relates to a hot-melt adhesive composition which is effective for bonding at low temperatures and which affords superior heat- and solvent-resistance and water-proofness to the joined materials.

2. Description of the Prior Art

The known thermoplastic hot-melt adhesives include polyethylene ionomers, ethylene-vinyl acetate copolymers, polyesters and polyamides. Polyethylene ionomers, ethylene-vinyl acetate copolymers and polyester adhesives are inferior in their bonding strength and their heat- and solvent-resistance, although they are generally satisfactory for bonding at a lower temperature. The polyamide adhesives include homopolymers of nylon 11 and nylon 12 which are film-like hot-melt adhesives possessing good heat- and solvent-resistance and water-proofness. These latter polyamide adhesives can be used only with a limited class of substrate materials because of their higher bonding temperature. The so-called nylon copolymers which are internally plasticized so as to lower their melting point to make them suitable for low temperature bonding suffer from lower heat- and solvent-resistance and water-proofness. It is also known to apply epoxy resin films on both sides of nylon homopolymer films for improving the heat- and solvent-resistance and water-proofness of the bonded materials, or to use a so-called nylon epoxy type adhesive consisting of the nylon copolymers mixed with epoxy resin. These known adhesives are also inconvenient to use because they must be heated for a long time at high temperatures until complete setting is attained.

SUMMARY OF THE INVENTION

We have discovered a hot-melt adhesive composition containing methoxymethylated terpolymer prepared from the corresponding terpolymer which is soluble in lower alcohols and contains a higher nylon salt, ω-amino acid and lactam, each of which has more than 10 carbon atoms, wherein the methoxymethylation ratio is in the range of 10 to 30%. The methoxymethylation ratio means the ratio of the number of nitrogen atoms bonded to methoxymethyl groups to the total number of nitrogen atoms contained in the nylon copolymer.

According to the present invention, various agents can be added to the hot-melt adhesive or the manufacturing conditions can be varied for obtaining film-like hot-melt adhesives suited for various requirements.

The methoxymethylation ratio should be in the range of 10 to 30% and preferably in the range of 15 to 25%. When the methoxymethylation ratio is less than 10%, the desired properties cannot be imparted to the adhesive material, while when the methoxymethylation ratio is over 30%, the manufacturing process is accompanied with difficulties and the desired effect of the methoxymethylation may be reduced.

Nylons having less than 10 carbon atoms, such as type 8 nylon obtained by N-methoxy-methylation of nylon 6, cannot be used as a film-like hot-melt adhesive, according to this invention, because of increased hygroscopicity and reduced weatherability.

The term higher nylon salt refers to the conventional class of reaction products of diamines ($H_2N\ R_1NH_2$) with dicarboxylic acids (HOOC R COOH), useful as intermediates in the preparation of nylon polymers, exemplified by the reaction of hexamethylene diamine with adipic acid to form nylon 66 salt and the reaction of hexamethylene diamine with sebacic acid to form nylon 610 salt. As indicated, the sum of the carbon atoms in $R_1$ plus —CRC— is at least 10. The term ω-amino acid refers to compounds of the formula $H_2NRCOOH$, also a conventional class of materials used in the preparation of nylon polymers, exemplified by ω-aminocaproic acid for nylon 6 and ω-aminoundecanoic acid for nylon 11. The term lactam refers to compounds of the formula

also a conventional class of materials used in the preparation of nylon polymers, exemplified by caprolactam for nylon 6 and lauryl lactam for nylon 12.

It is preferred to employ nylon terpolymers of three of nylon 6, nylon 11, nylon 12, nylon 66 and nylon 610 having melting points of less than 150° C. It is especially preferred to employ terpolymers of nylon 12 : nylon 6 : nylon 66, copolymerized in a weight ratio of 25-45 : 25-45 : 25-45 percent by weight.

A preferred lactam having more than 10 carbon atoms is laurolactam. Among the ω-amino acids having more than 10 carbon atoms there can be named ω-aminodecanoic acid, ω-aminoundecanoic acid, ω-aminododecanoic acid and ω-aminotridecanoic acid. Among the higher nylon salts having more than 10 carbon atoms there can be named hexamethylenediamine sebacate, dodecacanedicarboxylic acid salt of hexamethylenediamine, tridecanedicarboxylic acid salt of hexamethylenediamine, decamethylenediamine sebacate, dodecanedicarboxylic acid salt of decamethylenediamine, tridecanedicarbocylic acid salt of decamethylenediamine, tridecanedicarboxylic acid salt of dodecamethylenediamine, dodecanedicarboxylic acid salt of dodecamethylenediamine, decamethylenediamine azelate, dodecamethylenediamine azelate, tridecamethylenediamine azelate, and mixtures thereof.

The temperatures, pressures and times of the bonding step are those which are sufficient to effect bonding of the substrates through the film of adhesive material. When the substrate is fibrous, pressures in the range of 0.01 to 1 Kg/cm$^2$, temperatures in the range of 100° to 160° C. and pressing times in the range of 0.2 to 20 seconds give satisfactory results. When the substrate is metal, pressures in the range of 5 to 10 Kg/cm$^2$, temperatures of 120° C. to 180° C. and pressing times in the range of 0.2 to 30 minutes give satisfactory results.

BRIEF DESCRIPTION OF THE DRAWINGS

FIG. 1 is a graph showing the melting behavior of the inventive and comparative adhesives;

FIG. 2 is a graph showing the bonding performance of the inventive and comparative adhesives, as applied to fibrous substrates; and FIG. 3 is a graph showing the bonding performance of the inventive and comparative adhesives, as applied to metal substrates.

The present invention will be further described in detail by reference to the following illustrative examples.

EXAMPLE 1

100 grams of a ternary nylon copolymer (melting point, 130° C.; relative viscosity, 1.80; melt index, 9.5) synthesized from 40 parts of caprolactam, 20 parts of nylon 66 salt and 40 parts of lauryllactam (hereinafter designated as untreated) were charged into a stainless steel autoclave, together with 40 grs. of paraformaldehyde and 120 grs. of methanol, and the charged materials were heated under agitation to completely dissolve the nylon copolymer component. Then, a methanol solution containing 4 grs. of 85% phosphoric acid was added at 60° C. and the reaction was continued for 30 minutes. After cooling, the liquid reaction product was added to a large quantity of water under agitation. The resulting N-methoxymethylated nylon copolymer (designated hereinafter as MM-2) had a methoxymethylation ratio of 15.6%.

N-methoxymethylated nylon copolymers with methoxymethylation ratios of 9.5% (hereinafter designated as MM-1), 20.5% (hereinafter designated as MM-3) and 34.5% (hereinafter designated as MM-4) were prepared in the same way as described above, by correspondingly changing the addition amounts of paraformaldehyde. 20 grams of each of the control and MM-1 to MM-4 were added separately into 80 grs. of a mixed solvent consisting of methanol and trichloroethylene mixed at a weight of 70 : 30. Each of the resulting mixtures was agitated at 50° C. for completely dissolving the solutes. Each of the resulting solutions was coated on a polytetrafluoroethylene resin sheet so that the dry film thickness is 50μ. Each of the resulting films was dried for 30 minutes at room temperature with cool air and for a further period of 30 minutes with warm air at 50° C. to give a film of the untreated terpolymer and a film for each of the MM-1 to MM-4. A film of the so called 8 type nylon obtained by methoxymethylation of nylon 6 (hereinafter designated as MM-6) was produced in the same way as described above.

The curves shown in FIG. 1 designate the melting behavior of the respective films (untreated and MM-1 to MM-4) obtained by using a differential scanning calorimeter (PERKIN DSC-1-B manufactured by PERKIN-ELMER) at the heating rate of 16° C. per minute.

Tests of the adhesiveness of each of the six films, that is, untreated terpolymer, MM-1 to MM-4 and MM-6, to a mixed spun fabric consisting of 65% of polyester and 35% of cotton were carried out in accordance with JIS 1415. The bonding was carried out by using a small size table press, using a bonding time period of 5 seconds, a constant bonding pressure of 0.1 kg/cm² and bonding temperatures of 90° to 160° C.

FIG. 2 shows the values of bonding strength of the respective films plotted against bonding temperatures. Table 1 shows the data relating to the changes in the feel and bonding strength of the respective films obtained by washing tests.

Table 1

| | Results of Various Washing Tests | | | | |
|---|---|---|---|---|---|
| | Bonding strength (kg/25mm)[1] | | | | |
| Films | Normal | After[2] water washing | After[3] washing with a laundry washer | After[4] dry-cleaning | Feel |
| Untreated | 1.2 | 0.5 | scales off | 0.3 | stiff |
| MM-1 (control) | 1.6 | 0.7 | " | 0.08 | " |
| MM-2 (invention) | 7.1 | 5.6 | 5.1 | 6.2 | rubber like and resilient |
| MM-3 (invention) | 7.2 | 5.9 | 5.4 | 6.1 | " |
| MM-4 (control) | 2.2 | 1.0 | 0.5 | 1.1 | " |
| MM-6 (control) | 2.1 | scales off | 0.2 | 0.4 | " |

[1] Bonding was performed at 140° C for 5 seconds at a bonding pressure of 0.1 kg/cm².
[2] Washing was carried out for one hour by using an automatic reversing agitator type washer. Neutral detergent concentration, 0.5%; bath ratio, 50 : 1; bath temperature, 50° C. The washed goods were dried for one hour at room temperature. This procedure was carried out 5 times and thereafter the bonding strength was measured.
[3] Washing was carried out for 30 minutes at a bath temperature of 80° C by using an aqueous solution containing 0.3% of bleaching agent, 0.1% of surfactant and 0.5% of neutral detergents. The bonding strength was measured after the washed goods were dried at 100° C for 10 minutes.
[4] The goods were dipped for 20 minutes in a dry cleaning solution consisting of trichloroethylene and perchloroethylene mixed at a 50 : 50 weight ratio, dried at 60° C for 10 minutes and measured for bonding strength of the films.

It can be seen from FIG. 1 that the curves exhibit sharp peak values corresponding with the melting points and which are shifted towards the lower temperatures as a result of N-methoxymethylation.

The untreated nylon copolymer melts more gradually and thus over a wide range of temperature, whereas the MM-2 and MM-3 films (invention) are melted at a lower range of temperature which has a well-defined peak value. The melting behavior of the MM-1 film (control) is comparable with that of the untreated film. The MM-4 film (control) with methoxymethylation ratio of 34.5% melts over a wide range of temperature, although the melting point is shifted downwards.

The lower and well-defined melting points of MM-2 and MM-3 are responsible for improved bonding strength and bonding at lower temperatures, as is evidenced by the hot-melt bonding tests. It is to be noted that melting at a lower and well-defined temperature results in improved wetting performance and penetrability, which in turn means that the inventive adhesive has an improved adhesive property. It is also to be noted that such desirable properties as affinity and compatibility which are absent in the untreated nylon copolymer are imparted to the inventive adhesive by virtue of the N-methoxymethylation, which introduces active groups other than amido groups to the molecular structure of the nylon copolymer.

It can be seen from FIG. 2 that N-methoxymethylated nylon copolymers MM-2 and MM-3 can be melted at a low temperature and thus exhibit an improved bonding force as compared with the film of untreated polymer.

However, the melting behavior and hence the bonding properties of the MM-1 film are not improved significantly over those of the film of untreated polymer. The MM-4 film is bonded at a lower temperature than MM-2 and MM-3 films, but it exhibits a generally low bonding force which cannot be improved even when the bonding is performed at a higher temperature. The same applies to the N-methyoxymethylated nylon 6 film (MM-6 film). Such phenomenon may be attributed to the low tensile strength of these films. The MM-2 and MM-3 films can be bonded at a low temperature and they exhibit an unexpectedly improved bonding force.

The N-methoxymethylated nylon copolymer with a methoxymethylation ratio of 30% will become agglomerated into a rubber-like block when immersed again in water and it cannot be formed into powders or flakes.

Moreover, it can be seen from Table 1 that the MM-2 and MM-3 films exhibit superior resistivity to water-washing, laundry washing and dry-cleaning. These tests are intended primarily for testing the water-proofness, heat-resistance and the solvent-resistance of the adhesive films, respectively. It is apparent that the resistivity of the nylon copolymer (untreated) and the MM-1, MM-4 and MM-6 films to these durability tests are low.

EXAMPLE 2

To 20 gram samples of each of the nylon copolymer obtained in Example 1 (untreated), N-methoxymethylated nylon copolymers (MM-1 to MM-4) and N-methoxymethylated nylon 6 (MM-6) was added 0.3 g, or 1.5 wt% based on the resin, of L-tartaric acid as a hardener. To the resulting mixture were added 80 grams of a mixed solvent consisting of 70 wt.% of methanol and 30 wt.% of trichloroethylene. The resulting mixtures were heated at 50° C. under agitation to completely dissolve the solutes. Each of the resulting dissolved products was deposited on a polytetrafluoroethylene sheet so that a dry film thickness of 50μ is attained as in the preceding Example 1. The coated polytetrafluoroethylene sheets were dried for 30 minutes at room temperature by using cool air and then for a further period of 30 minutes by using warm air at 50° C. in order to form the respective films.

These films were used for bonding a soft copper plate, 1.0 mm thick, which had been degreased with trichloroethylene. Hot-melt bonding was carried out with a heater press by using a bonding temperature of 120° C., a bonding pressure of 5 kg/cm² and a bonding time of 10 minutes. Then, the T-scaling strengths of the respective films were measured in accordance with ASTM 1876-69.

FIG. 3 shows the relationship between the peeling temperature and T-scaling strength of the sample goods bonded with the respective films. Table 2 shows the values of film strength and elongation for various curing time intervals.

Table 2

| Films | Curing time (min.) | Breaking strength (kg/cm²) | Breaking elongation (%) |
|---|---|---|---|
| Untreated | 0 | 340 | 410 |
|  | 5 | 310 | 390 |
|  | 10 | 280 | 320 |
|  | 0 | 330 | 450 |
| MM-1 | 5 | 345 | 390 |

Table 2-continued

Film strength and elongation for various curing time intervals

| Films | Curing time (min.) | Breaking strength (kg/cm²) | Breaking elongation (%) |
|---|---|---|---|
| (control) | 10 | 400 | 270 |
|  | 0 | 240 | 580 |
| MM-2 | 5 | 400 | 440 |
| (invention) | 10 | 560 | 360 |
|  | 0 | 210 | 600 |
| MM-3 | 5 | 450 | 410 |
| (invention) | 10 | 620 | 340 |
|  | 0 | 160 | 700 |
| MM-4 | 5 | 175 | 640 |
| (control) | 10 | 120 | 420 |
|  | 0 | 130 | 410 |
| MM-6 | 5 | 150 | 340 |
| (control) | 10 | 180 | 310 |

It will be seen from Table 3 that the MM-2 and MM-3 films retain a high bonding force even at a higher bonding temperature. On the other hand, the untreated and both MM-1 and MM-4 films are deteriorated in their bonding strength with an increase in the bonding temperature. The MM-6 film may retain its bonding strength to some degree with rise in the bonding temperature, but the bonding force is low.

It is also shown in Table 2 that films of N-methoxymethylated nylon copolymers added with a hardener at the time of preparation of the sample films may be promoted in their hardening process by being cured for a proper time duration and at a suitable temperature.

As a hardener, there can be added 0.5 to 8 weight percent, preferably 1 to 5 weight percent, based on the weight of the N-alkoxymethylated nylon terpolymer, of an aliphatic carboxylic acid such as tartaric acid, maleic acid, crotonic acid, malonic acid, succinic acid, oxalic acid, adipic acid or citric acid, an aromatic carboxylic acid such as o-, m- or p-hydroxybenzoic acid, 2,4-dihydroxybenzoic acid, or 2-hydroxy-4-methoxybenzoic acid or an inorganic acid such as hypophosphorous acid. Also, p-toluenesulfonic acid chromic acid anhydride can be used.

Thus, in the present Example, the film is prepared with the addition of a hardener in an amount that will inhibit hardening of the film until the latter is used for bonding purposes. The hardening process occurs during the hot-melt bonding which is carried out in the present Example for 10 minutes at a bonding temperature of 120° C. In this way, the fabric can be bonded at a higher temperature as though the bonding were performed by using thermosetting resin adhesive. As in Example 1, the desired effect cannot be obtained when the methoxymethylation ratio is lower than 10% or higher than 30%.

EXAMPLE 3

The adhesive films prepared in Example 1 and deposited on soft steel plates were tested as to their heat- and cold-resistance, water-proofness and resistance to hot water. The results are shown in the following Table 3. The bonding strengths were measured in the same way as in the preceding Example 2.

Table 3

Results of Tests on Durability

Bonding strength (kg/25mm)

| Films | Normal | After[*1] Water-proofness Test | After[*2] Humidity Test | After[*3] Hot-water resistance Test | After[*4] Hot resistance Test | After[*5] Cold resistance Test | After[*6] Hysteresis Test |
|---|---|---|---|---|---|---|---|
| Untreated | 9.9 | 3.2 | 4.7 | scales off | 4.1 | 8.8 | 3.1 |

Table 3-continued
Results of Tests on Durability
Bonding strength (kg/25mm)

| Films | Normal | After*1 Water- proofness Test | After*2 Humidity Test | After*3 Hot- water resistance Test | After*4 Hot resistance Test | After*5 Cold resis- tance Test | After*6 Hyst- eresis Test |
| --- | --- | --- | --- | --- | --- | --- | --- |
| MM-1 (control) | 10.5 | 4.6 | 7.1 | 1.8 | 6.7 | 9.6 | 5.6 |
| MM-2 (invention) | 12.2 | 11.6 | 11.8 | 9.7 | 12.5 | 11.9 | 10.9 |
| MM-3 (invention) | 14.0 | 12.6 | 13.1 | 10.5 | 14.8 | 13.2 | 13.3 |
| MM-4 (control) | 5.1 | 2.1 | 1.9 | scales off | 2.6 | 2.4 | 1.1 |
| MM-6 (control) | 6.3 | 1.7 | 3.6 | " | 4.7 | 5.6 | 1.6 |

NOTE:
*1 Bonding strengths were measured after the films were immersed for one week in a flowing supply water at 20° C.
*2 Bonding strengths were measured after the test films were left for one week in a 90% RH atmosphere at 40° C.
*3 Bonding strengths were measured after the test films were boiled for one hour in boiling water at 100° C.
*4 Bonding strengths were measured after the test films were left for one hour in an oven at 80° C.
*5 Bonding strengths were measured after the test films were left for one hour in a refrigerator at −20°C.
*6 The test fabric was left for one hour in an oven at 80° C and the for one hour in a refrigerator at −10° C. Bonding strengths were measured after the above sequence was repeated 10 times successively.

It will be seen from Table 3 that the MM-2 and MM-3 samples show superior durability in all of these tests and that they retain their bonding strength satisfactorily.

The embodiments of the invention in which an exclusive property or privilege is claimed are defined as follows:

1. A hot melt adhesive consisting essentially of a methoxymethylated nylon terpolymer of nylon 12 : nylon 6 : nylon 66, copolymerized in a weight ratio of 24–45 : 25–45 : 25–45, said nylon terpolymer having a melting point of less than 150° C. and having a methoxymethylation ratio in the range of from 15 to 25%, wherein the methoxymethylation ratio is the ratio of nitrogen atoms bonded to methoxymethyl groups to the total number of nitrogen atoms contained in the nylon terpolymer.

2. An adhesive according to claim 1 containing from 0.5 to 8 weight percent, based on the weight of said terpolymer, of a hardener selected from the group consisting of tartaric acid, maleic acid, crotonic acid, malonic acid, succinic acid, oxalic acid, adipic acid, citric acid, o-, m- and p-hydroxybenzoic acid, 2,4-dihydroxybenzoic acid, 2-hydroxy-4-methoxybenzoic acid, hypophosphorous acid, p-toluenesulfonic acid and chromic acid anhydride.

3. An adhesive according to claim 1 in the form of a film having a thickness of from 5 to 50 microns.

4. A process for adhering together fibrous substrates which comprises placing between said substrates a film of adhesive as claimed in claim 3 and then pressing said substrates together at a pressure of 0.01 to 1 kg/cm$^2$, at a temperature of 100° to 160° C. for 0.2 to 20 seconds so that said film melts and adhesively secures together said substrates.

5. A process for adhering together metal substrates which comprises placing between said substrates a film of adhesive as claimed in claim 3 and then pressing said substrates together at a pressure of 5 to 10 kg/cm$^2$, at a temperature of 120° to 180° C. for 0.2 to 30 minutes so that said film melts and adhesively secures together said substrates.

* * * * *